US006274957B1

(12) United States Patent
Mahn et al.

(10) Patent No.: US 6,274,957 B1
(45) Date of Patent: Aug. 14, 2001

(54) REDUCED SIZE ELECTROMAGNETIC DEVICE

(75) Inventors: Jeffrey P. Mahn, Clayton; Charles P. Ketterer, Fenton, both of MO (US); Jeffrey D. Neumann, Spencervile, IN (US); Todd Andrew Walls, Rock Hill, MO (US); Bradley Gerard Kohring, Evansville, IN (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 09/419,584

(22) Filed: Oct. 18, 1999

Related U.S. Application Data

(63) Continuation of application No. 09/148,652, filed on Sep. 4, 1998, now abandoned.

(51) Int. Cl.⁷ .................................................. H02K 5/00
(52) U.S. Cl. .................................. 310/89; 310/91; 29/596
(58) Field of Search .......................... 310/89, 91, 71, 310/194, 217, 254, 260; 29/596

(56) References Cited

U.S. PATENT DOCUMENTS

| | | | |
|---|---|---|---|
| 2,583,804 | 1/1952 | Andrus | 310/87 |
| 3,002,119 | 9/1961 | Lindstrom | 310/260 |
| 3,343,013 | * 9/1967 | Wightman et al. | |
| 3,378,711 | 4/1968 | Swanke | 310/260 |
| 3,433,990 | 3/1969 | Stone | 310/258 |
| 3,437,853 | 4/1969 | Arnold | 310/92 |
| 3,671,790 | 6/1972 | Widstrand | 310/216 |
| 3,984,712 | 10/1976 | Hill | 310/71 |
| 4,110,644 | * 8/1978 | Roddy | 310/91 |
| 4,161,669 | 7/1979 | Aimar | 310/194 |
| 4,322,647 | 3/1982 | Neroda et al. | 310/71 |
| 4,340,829 | 7/1982 | McCoy | 310/71 |
| 4,481,435 | 11/1984 | Loforese | 310/71 |
| 4,631,433 | 12/1986 | Stokes | 310/89 |
| 4,707,627 | 11/1987 | Best | 310/71 |
| 4,712,030 | 12/1987 | Lakin et al. | 310/89 |
| 4,765,054 | 8/1988 | Sauerwein et al. | 29/596 |
| 4,988,905 | 1/1991 | Tolmie, Jr. | 310/68 B |
| 5,103,225 | 4/1992 | Dolan et al. | 341/13 |
| 5,182,848 | 2/1993 | Wheeler | 29/596 |
| 5,204,566 | * 4/1993 | Borgen et al. | 310/71 |
| 5,268,604 | 12/1993 | Katakura | 310/71 |
| 5,306,976 | 4/1994 | Beckman | 310/215 |
| 5,430,931 | 7/1995 | Fisher et al. | 29/594 |
| 5,475,275 | * 12/1995 | Dohogne et al. | 310/89 |
| 5,475,276 | 12/1995 | Shiga et al. | 310/154 |
| 5,508,571 | 4/1996 | Shafer, Jr. | 310/71 |
| 5,610,461 | * 3/1997 | Dohogne et al. | 310/89 |
| 5,668,429 | * 9/1997 | Boyd, Jr. et al. | 310/254 |
| 5,723,926 | 3/1998 | Obara et al. | 310/89 |
| 5,936,320 | * 8/1999 | Takeda et al. | 310/89 |

FOREIGN PATENT DOCUMENTS

| | | |
|---|---|---|
| 0 235 443 A1 | 9/1987 | (EP) . |
| 0 630 095 A1 | 12/1994 | (EP) . |
| 0740399A1 | 10/1996 | (EP) . |
| 2 256 573 | 7/1975 | (FR) . |
| 04355638 | 9/1992 | (JP) . |
| WO 93/21681 | 10/1993 | (JP) . |

OTHER PUBLICATIONS

"Rigid Plastic For Motor End Frame", Machine Design; 62, Jun. 7, 1990, No. 12, p. 44, Cleveland, Ohio.

* cited by examiner

*Primary Examiner*—Joseph Waks
(74) *Attorney, Agent, or Firm*—Howell & Haferkamp, L.C.

(57) ABSTRACT

An electromagnetic device of significantly reduced size is provided by the specific designs of the end shields of the device and by the specific designs of insulating end caps of the device that insulate the electrical component parts of the device from contact and possible shorting with mechanical structural parts of the device.

18 Claims, 9 Drawing Sheets

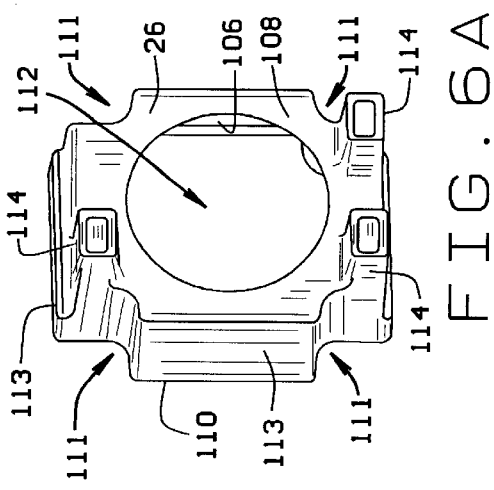
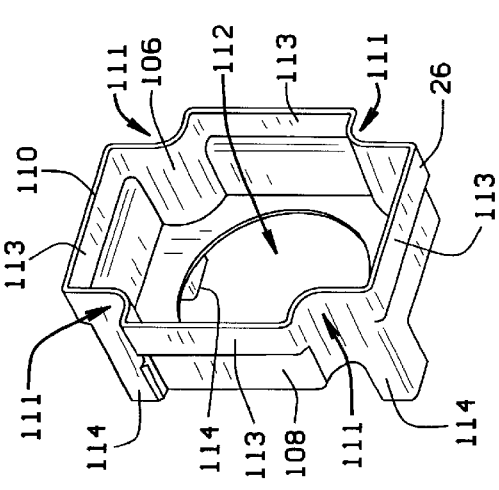
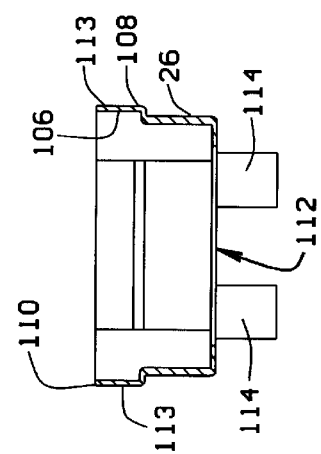
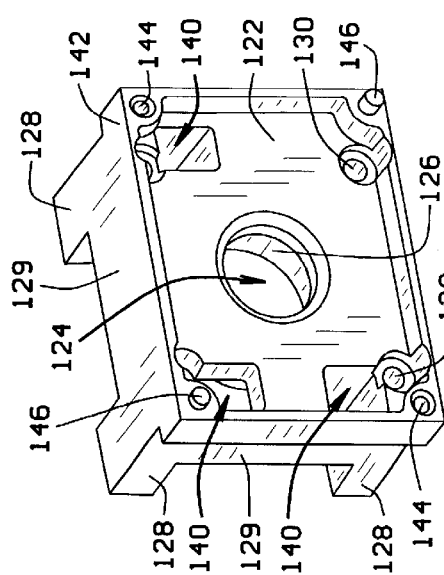
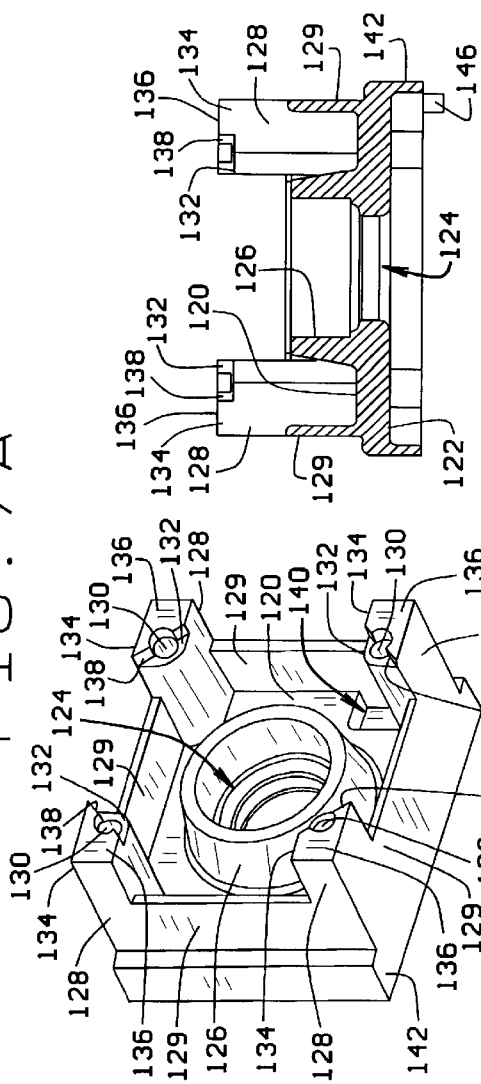

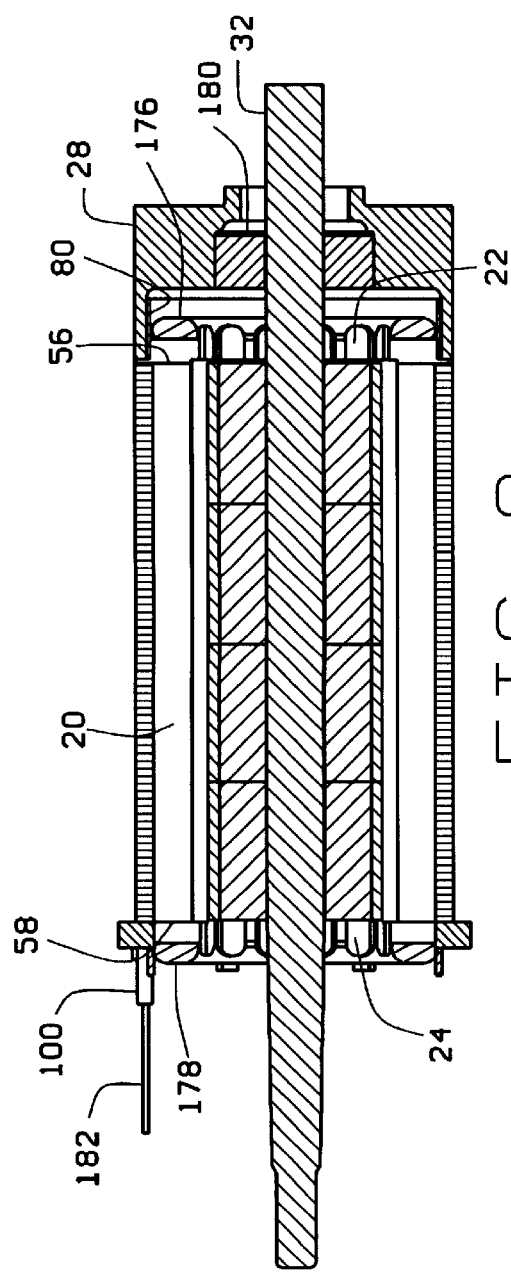
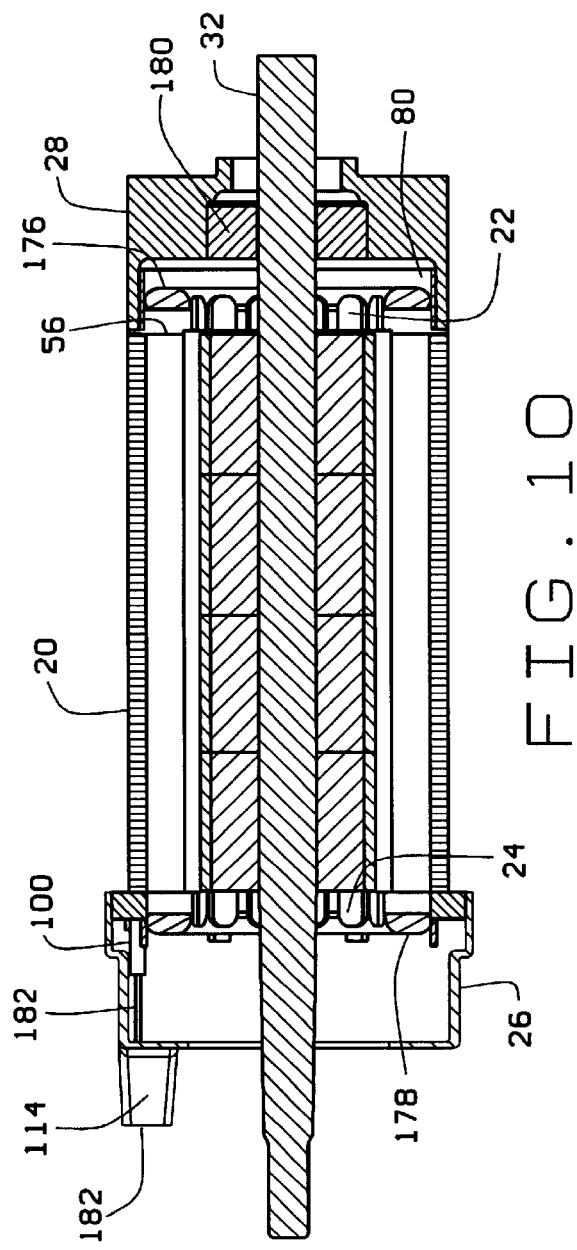

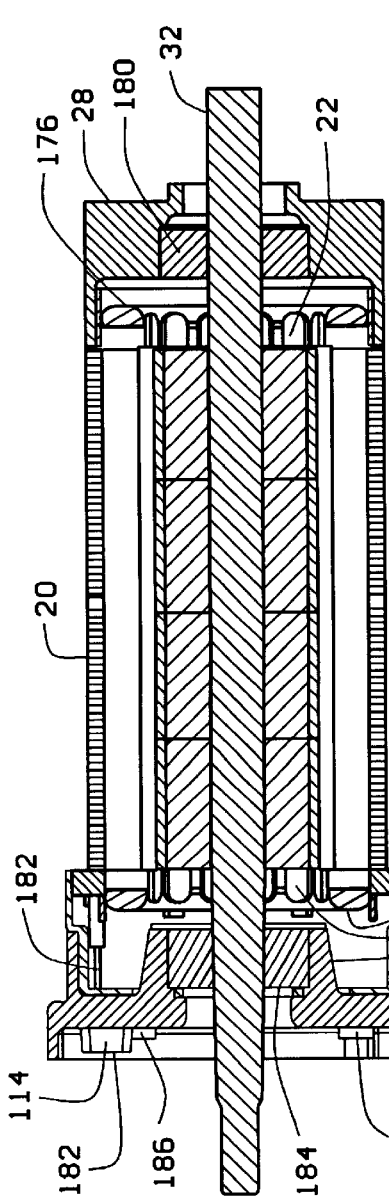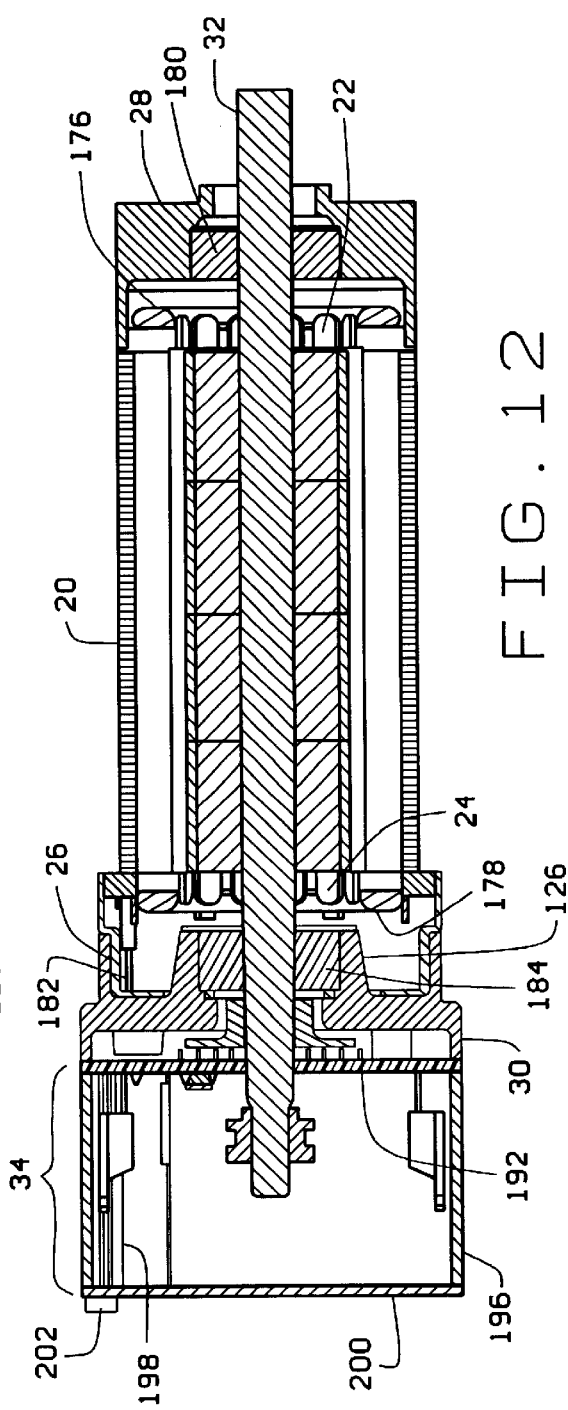

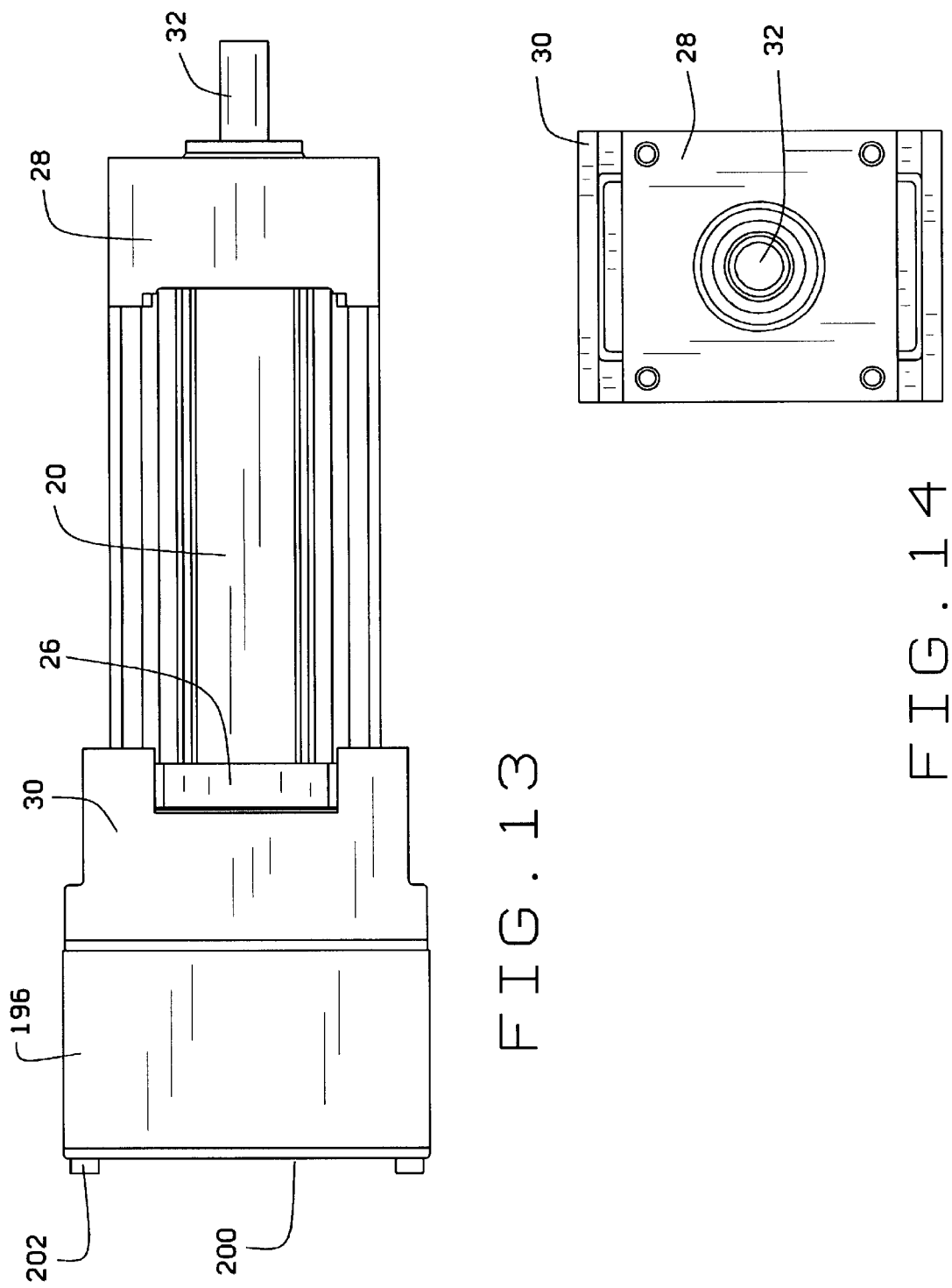

REDUCED SIZE ELECTROMAGNETIC DEVICE

This patent application is a continuation of patent application Ser. No. 09/148,652, filed Sep. 4, 1998 and now abandoned.

BACKGROUND OF THE INVENTION (1) Field of the Invention

The present invention pertains to the construction of an electromagnetic device, such as an electric motor or electric generator, where component parts of the electromagnetic device have been redesigned to significantly reduce its size.

(2) Description of the Related Art

Current trends in the design of electromagnetic machines such as motors have lead to compact designs of high efficiency motors. The motor designs have obtained high power to weight and high power to size ratios through their use of high magnetic flux density magnets on their rotors and high density windings on their stators.

Compact high efficiency motors are constructed of basically the same component parts of larger motors, those being a casing or housing shell containing the stator, a pair of end shields attached to opposite ends of the stator, and a rotor supported for rotation in the stator bore by a pair of bearings mounted in the end shields.

In the reduction in size of these high efficiency motors the surface areas of motor component parts available for use in establishing secure connections between the component parts is also reduced. For example, in the construction of a larger motor there are typically substantial areas on interfacing surfaces of motor component parts, such as a stator and an end shield, to accommodate connectors such as nut and bolt connectors to securely hold the two component parts together. With the ample areas available on the interfacing surfaces of the component parts, larger connectors may be employed to securely hold the component parts together. However, when the motor is significantly reduced in size, all of its component parts are reduced including the interfacing surfaces of mating component parts and the connectors employed in securely holding the component parts together. In reduced size motors, the component parts must be redesigned in order to provide the needed secure connections between the component parts.

A reduction in motor size also requires positioning all of the motor component parts closer together. This includes the electrical component parts of the motor such as the stator winding, and the structural component parts of the motor such as the end shields. Reduced motor size brings the end shields much closer to the end turns of the stator winding presenting the undesirable possibility of arcing or shorting of the stator winding with the metal end shields. The reduction in size bringing component parts closer together also presents the problem of heat generated in one area of the motor adversely affecting another area of the motor, for example, the electronics of the motor. The component parts of the reduced size motor must be redesigned to avoid the potential problems of shorting and heat affecting motor performance.

SUMMARY OF THE INVENTION

The present invention is an electromagnetic device, such as a motor, having component parts that are assembled together to provide a motor of compact size having high efficiency. The novel features of the invention are in the constructions of the component parts and, although described as applied to a motor, they may also be applied to alternators and generators.

The motor of the invention is basically comprised of a stator containing the stator winding, a pair of end caps attached to axially opposite ends of the stator and insulating the end turns of the stator winding from the metal laminations of the stator, an insulator attached over one of the end caps, a pair of end shields, one attached over the end cap at one end of the stator and the other attached over the insulator at the opposite end of the stator, and a rotor. The novel features of the motor are primarily in its component parts assembled at the axially opposite ends of the stator. Therefore, the stator construction and rotor construction are described in only general terms with it being understood that alternative stator and rotor constructions may be employed with the invention.

The stator is comprised of a stack of individual stator laminations with each lamination having a generally octagonal peripheral edge and a plurality of stator poles extending radially inwardly toward a center bore of the laminate as is typical in many stator constructions. However, the octagonal shape of the peripheral edge is one of the novel features of the motor construction that contributes to the secure connection of the motor's component parts. With the stator laminates arranged in a stator stack, the exterior surface of the stator stack is octagonal and includes four spatially arranged pairs of flat surfaces separated by a semi-circular trough. The four pairs of flat surfaces and their middle troughs extend axially over the exterior surface of the stator stack between longitudinally opposite first and second end surfaces of the stator stack.

The first and second end caps are assembled over the opposite first and second end surfaces of the stator stack. Each end cap is constructed of an insulating material and includes a plurality of posts radiating inwardly toward a center bore of the cap. The posts are configured complimentary to the poles of the stator laminations and overlay the stator poles at the axially opposite ends of the stator. The end turns of the stator winding are wrapped around each of the end cap posts and in this manner the posts insulate the end turns from the metal of the stator poles. In addition, the first end cap at the first end of the stator has a spacer projecting therefrom. The spacer projects longitudinally and axially outwardly from the first end cap beyond the stator end turns wrapped around the posts of the first end cap. The spacer engages against the first end shield attached to the stator stack over the first end cap and thereby spaces the metal of the end shield from the turns in the stator winding ensuring that a short will not occur between the first end shield and the stator winding.

Thus second end cap, like the first end cap, is constructed of an insulating material and also includes inwardly radiating posts. End turns in the stator winding at the second end of the stator are wrapped around the posts of the second end cap in a conventional manner. In addition, the second end cap has supports for male terminal connectors that are connected to electrical leads of the stator winding. The supports project longitudinally and axially outwardly from the second end cap and securely hold the male electric terminals in a desired orientation that facilitates the assembly of the motor component parts.

The insulator is attached over the second end cap and the second end of the stator stack. The insulator is constructed of an electrically insulating and thermally insulating material. Its construction covers over the end turns of the stator winding at the second end of the stator and thereby insulates the end turns from the metal of the second end shield attached to the second end of the stator. In addition, the insulator thermally insulates any electronic components used in association with the motor and attached to the second end shield from the heat generated in the stator. The insulator is also formed with tubular lead guides corresponding to each of the male electric terminals supported by the second end cap. The tubular lead guides project longitudinally and axially outwardly from the insulator and surround each of the male terminals supported by the second end cap.

The second end shield is constructed with lead openings corresponding to the number of male terminals supported by the second end cap and the number of tubular lead guides on the insulator surrounding the terminals. The lead openings in the second end shield are positioned so that the tubular lead guides will pass through the openings and in this manner the tubular lead guides of the insulator also insulate the electric terminals of the stator from the metal of the second end shield. The tubular lead guides also positively position the male electric terminals of the stator relative to the second end shield so that they can easily be connected with female electric connectors of an electronics package associated with the motor as it is connected to the second end shield.

Both the first and second end shields are formed with generally square peripheral configurations and with four columns projecting longitudinally from the four corners of their square configurations. Each of the four columns of the end shields is formed with a flat base surface that mates against one of the first and second end surfaces of the stator stack. In addition, adjacent the base surfaces of the columns, shoulders project longitudinally outwardly from the base surfaces. The shoulders are formed with shoulder surfaces that overlie the pairs of flat surfaces on the exterior surface of the stator stack. The engagement of the column shoulder surfaces over the flat surfaces on the exterior of the stator stack securely holds the first and second end shields to the opposite first and second end surfaces of the stator stack preventing relative torsional or radial movement between the end shields and the stator stack.

With the design of the component parts of the electric motor described above, the size of the motor can be significantly reduced while avoiding the potential problems of securely connecting component parts of the motor together and insulating, both electrically and thermally, the electrical component parts of the motor from structural component parts.

DESCRIPTION OF THE DRAWINGS

Further features of the invention will be discussed in the following detailed description of the preferred embodiment of the invention and in the drawing figures wherein:

FIGS. 6A–6C are front perspective, rear perspective and side sectional views of the insulator;

FIGS. 7A–7C are front perspective, rear perspective and side sectional views of the second end shield;

FIG. 9 is a side sectional view of the electromagnetic device assembly with the rotor positioned in the stator, the end caps assembled to opposite ends of the stator, and the first end shield containing a bearing assembled to the first end of the stator;

FIG. 10 is a side sectional view similar to FIG. 9 but with the addition of the insulator assembled to the stator;

FIG. 11 is similar view to FIG. 10 but with the addition of the second end shield assembled to the stator;

FIG. 12 is a view similar to FIG. 11 but with an electronics package assembled to the second end shield;

FIG. 13 is a side elevation view of the completed electromagnetic device; and

FIG. 14 is a first end view of the electromagnetic device shown in FIG. 13.

DETAILED DESCRIPTION OF THE PREFERRED EMBODIMENT

Figure 1:
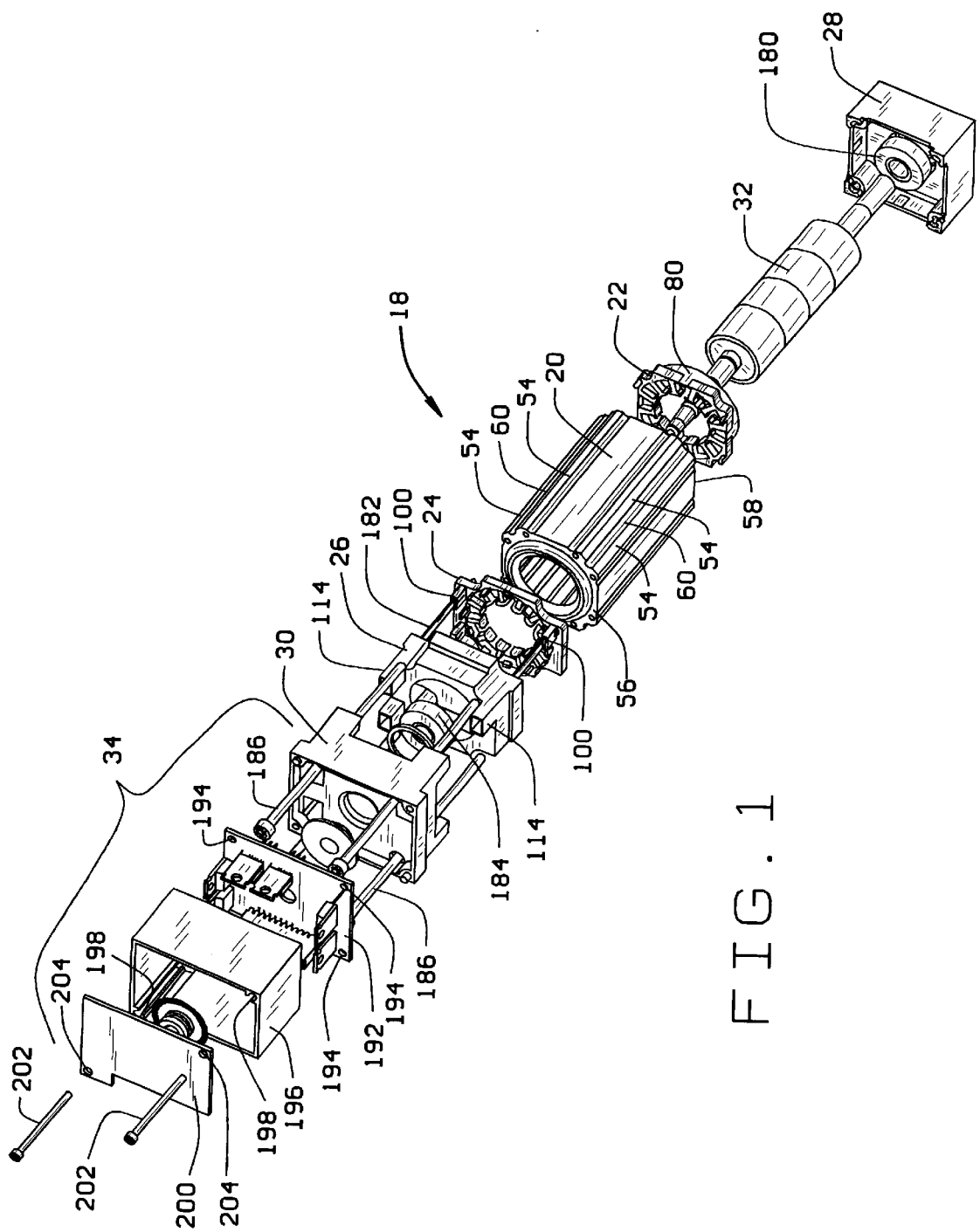
FIG. 1 is an exploded perspective view of the electromagnetic device of the invention.

FIG. 1 shows the primary component parts that make up the electromagnetic device 18 of the invention including the stator stack 20, a first end cap 22, a second end cap 24, an insulator 26, a first end shield 28, a second end shield 30 and a rotor 32. In FIG. 1 an electronics package 34 is also shown adjacent the second end shield 30. The particular electronics package 34 shown is an encoder, however other types of electrical devices commonly employed with electromagnetic devices such as motors or generators may be substituted for the encoder shown as the electronics package 34. The electronics package 34 is included in the description of the invention to illustrate the ease with which such an electronics package may be connected with the electrical leads of the electromagnetic device 18 due to the novel constructions of component parts of the device. It should be understood that the particular electronics package 34 shown is not intended to be construed as one of the novel features of the electromagnetic device construction and that other types of devices may or may not be employed with the electromagnetic device of the invention.

Figure 2:
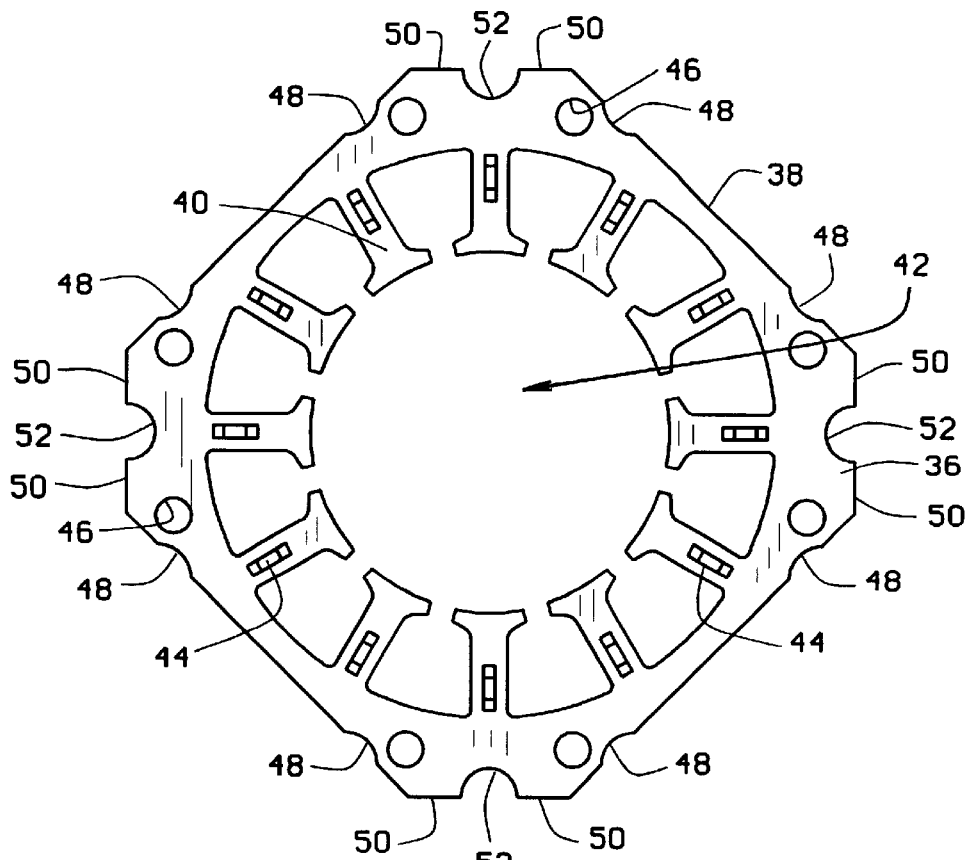
FIG. 2 is a plan view of a stator lamination of the device.

The stator 20 is constructed of a plurality of stator laminations 36 such as that shown in FIG. 2, which is typical of many stator constructions. Each of the laminations 36 has a generally octagonal peripheral edge 38 and a plurality of stator poles 40 that project radially inwardly toward a center bore 42 of the laminate, again as is typical in many constructions. Each of the stator poles 40 is stamped with an indent/protrusions 44 with an indentation on one side of each pole and a protrusion on the opposite side of each pole. The protrusions and indents of adjacent laminates in the stator stack engage with each other to hold the laminates of the stator stack together. Adjacent the peripheral edge 38, each laminate has a plurality of holes 46 extending therethrough. The holes 46 may be used in aligning the laminates when assembling the stator stack, but are primarily provided to receive projecting tabs on the second end cap when attaching the second end cap to the stator stack, as will be described. Grooves 48 are also formed in the peripheral edge 38 of the laminates. These grooves 48 are positioned to receive tabs on the first end cap when attaching the end cap to the stator stack as will be described.

Figure 3:
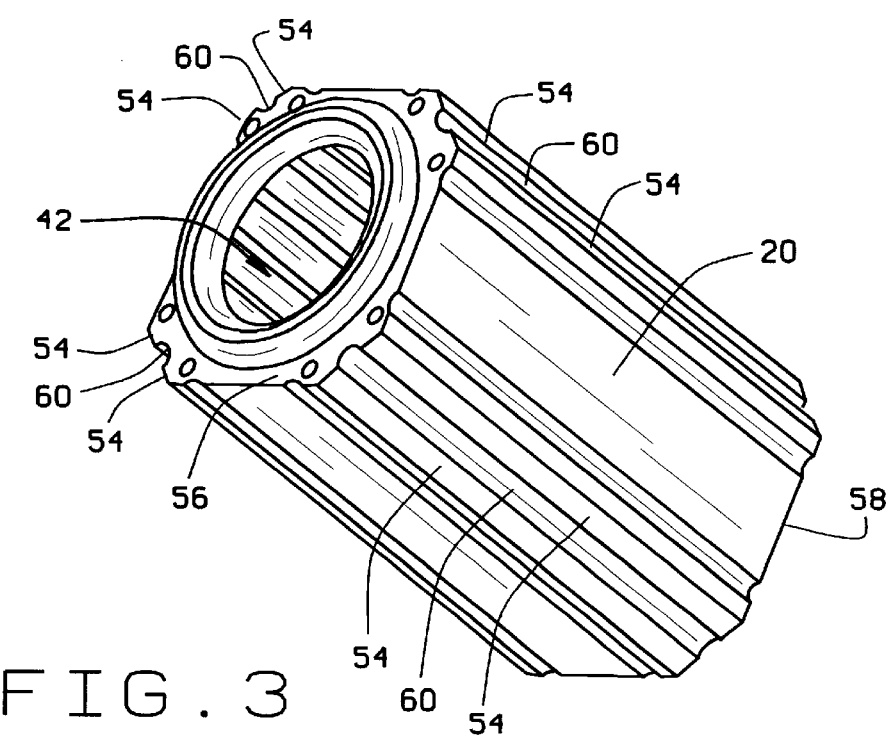
FIG. 3 is a perspective view of the stator stack.

The octagonal shape of the peripheral edge 38 is partly defined by four pairs of flats 50 formed in the peripheral edge at spatially arranged positions. Each pair of flats 50 has a semi-circular trough 52 positioned therebetween. When the laminates 36 are arranged in the stack 20 as shown in FIG. 3, the pairs of flats 50 and their troughs 52 form pairs of flat surfaces 54 that extend along the entire longitudinal length of the stator stack 20 between a first end surface 56 of the stator stack and a longitudinally opposite second end surface 58 of the stator stack. Each of the pairs of flat surfaces 54 on the exterior of the stator stack border a semi-circular trough 60 that also extends the entire longitudinal length of the stator stack between the opposite end surfaces 56, 58. The pairs of flat surfaces 54 on the stator exterior surface are provided to positively locate the end shields 28, 30 relative to the stator and to prevent torsional and/or radial movement of the end shields relative to the stator stack as will be explained. The trough surfaces 60 formed in the stator stack are provided to accommodate bolt fasteners as also will be explained.

Figure 4A:
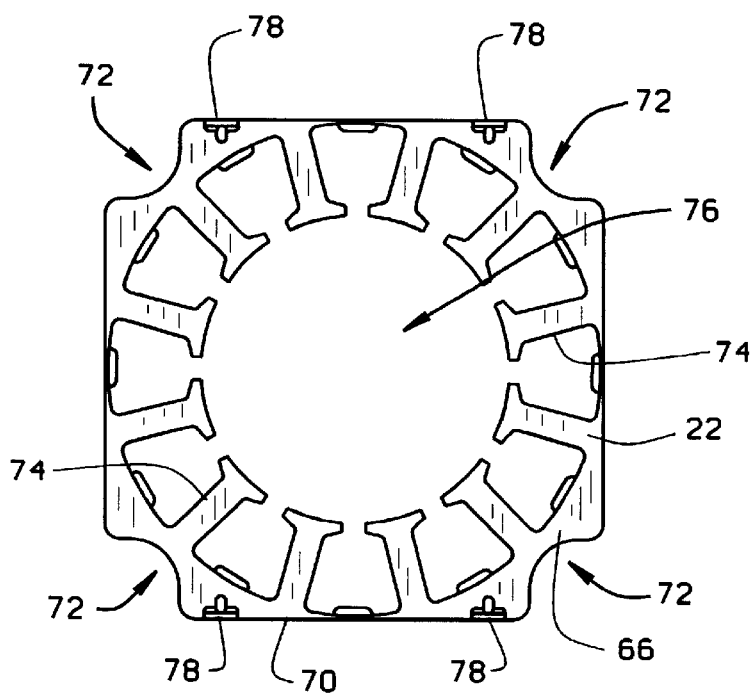
FIGS. 4A–4C are back, side sectional and front views of the first end cap.
Figure 4B:
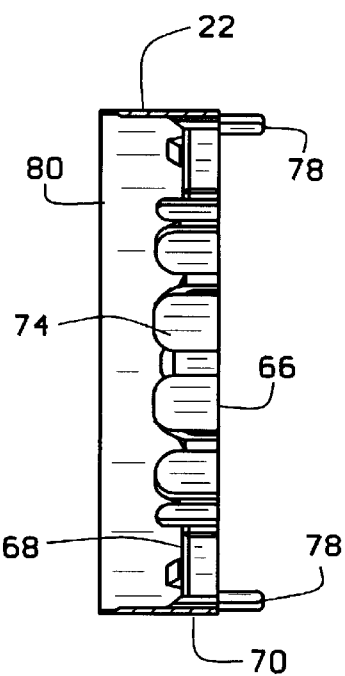
Figure 4C:
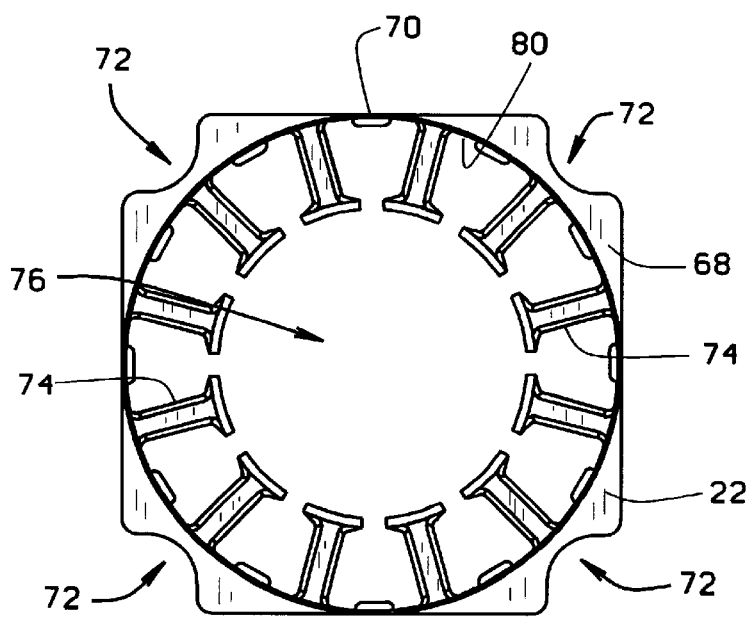

FIGS. 4A–4C show the first end cap 22. The first end cap 22 is preferably constructed of an electrically insulating material such as a plastic. The end cap has opposite rear 66 and front 68 surfaces with the rear surface being that which faces the stator stack 20 and the front surface being that which faces away from the stator stack. The end cap also has a peripheral edge 70 that is generally square except for four curved notches 72 in place of the corners of the end cap square configuration. The end cap also includes a plurality of posts 74 that radiate inwardly toward a center bore 76 of the end cap. The posts 74 are configured complimentary to the stator poles 40 and overlay the stator poles when the cap is assembled to the first end surface 56 of the stator stack. The end turns of the stator winding are wrapped around each of the end cap posts 74 and the posts insulate the end turns from the metal of the stator poles 40. The first end cap has four tabs 78 projecting outwardly from its rear surfaces 66. The four tabs 78 are spatially arranged around the peripheral edge 70 of the end cap to align with and be received in the grooves 48 of the stator stack when the first end cap is assembled to the first end surface 56 of the stator stack.

A spacer 80 projects longitudinally outwardly from the front surface 68 of the first end cap The spacer 80 is preferably cylindrical and surrounds all of the posts 74 of the first end cap. The spacer 80 is dimensioned sufficiently large so that it will project longitudinally from the end cap front surface 68 a distance beyond the end turns of the stator windings around the end cap posts 74. When the first end shield 28 is assembled to the stator stack 20 over the first end cap 22, the spacer 80 will engage with an interior surface of the first end shield 28 and will thereby space the metal end shield from the end turns of the stator windings preventing any shorting of the end turns with the metal of the end shield. In the preferred embodiment the spacer 80 has the cylindrical configuration shown. However, the spacer could be constructed as one or more posts extending longitudinally from the first end cap to the same longitudinal extent as the spacer 80 shown. However, the cylindrical configuration of the spacer 80 is preferred for its strength.

Figure 5C:
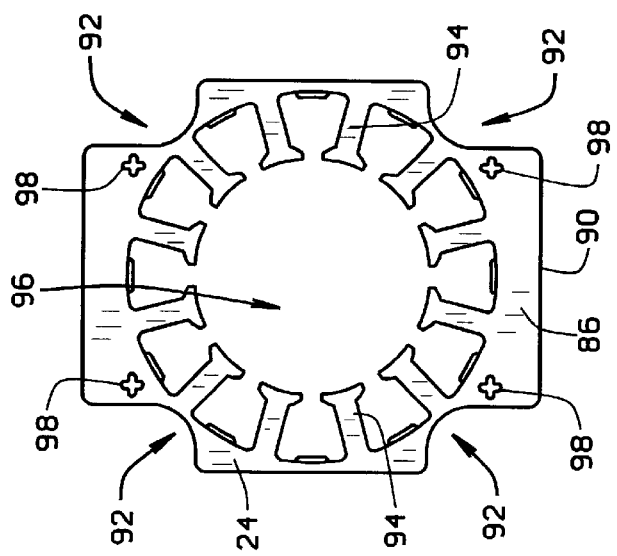
FIGS. 5A–5C are front, side sectional and rear views of the second end cap.
Figure 5B:
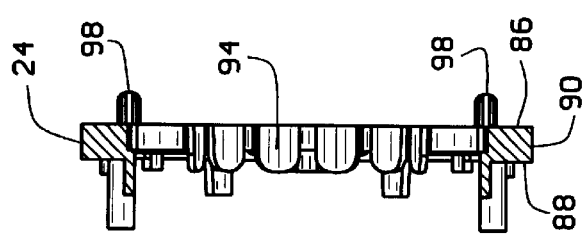
Figure 5A:
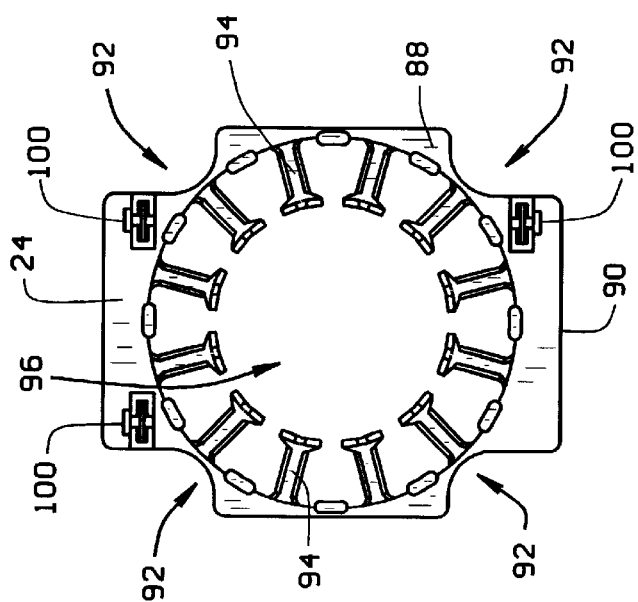
Figure 8A:
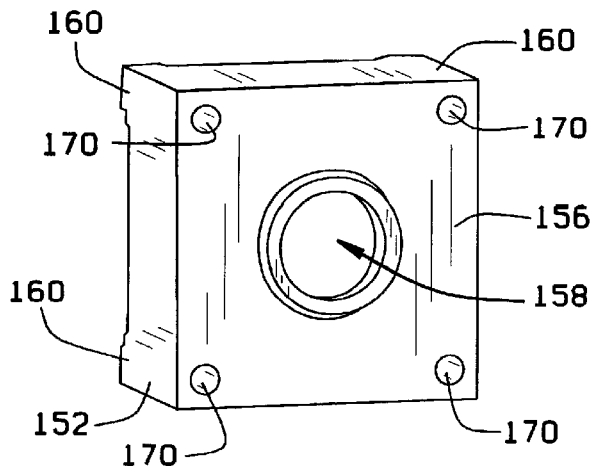
FIGS. 8A–8C are front perspective, rear perspective and side sectional views of the first end shield.
Figure 8B:
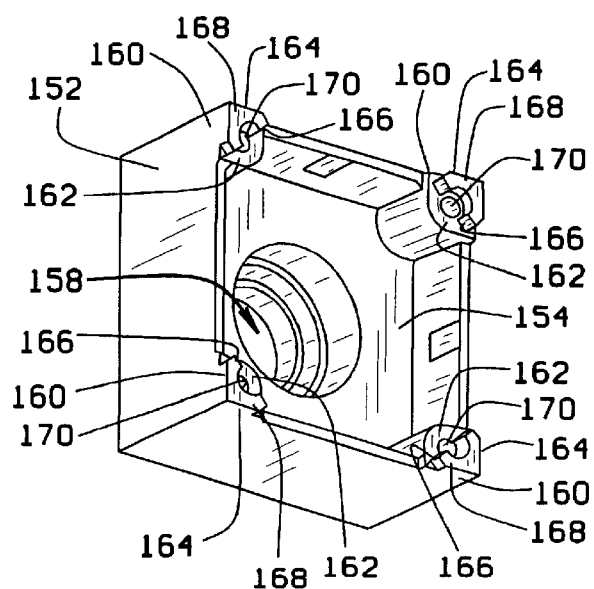
Figure 8C:
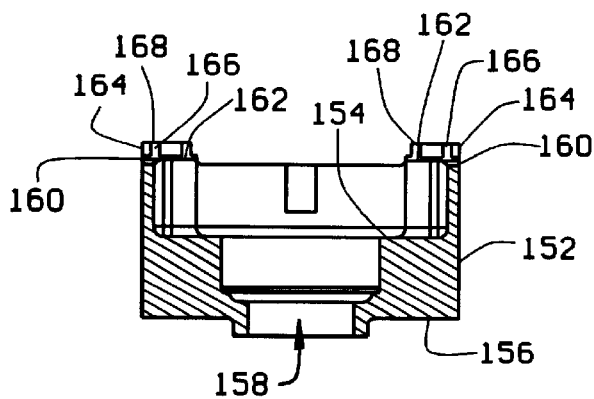

The second end cap 24 is shown in FIGS. 5A–5C. Like the first end cap, the second end cap is also constructed of an electrically insulating material such as a plastic. The second end cap has a rear surface 86 and an opposite front surface 88, with the rear surface 86 being that which faces the stator stack 20 and the front surface 88 being that which faces away from the stator stack. The second end cap also has a generally square peripheral edge 90 except for four notches 92 in place of the corners of the generally square configuration. The second end cap also includes a plurality of posts 94 around a center bore 96 of the end cap. The posts 94 are substantially identical to the posts 74 of the first end cap and are provided for the same functioning. Four tabs 98 project outwardly from the rear surface 86 of the end cap and are positioned to align with four of the holes 46 in the second end surface 58 of the stator stack in attaching the second end cap 24 to this surface of the stator stack.

In addition, the second end cap is provided with supports 100 for male terminal connectors that are connected to electrical leads of the stator winding. The supports 100 have center passages (not shown) that extend through the supports 100. The supports 100 positively position the male electric terminals of the stator winding to facilitate the assembly of the component parts of the electromagnetic device and the connection of the terminals to the female terminal connectors of the electronics package, as will be explained.

The insulator 26 is shown in FIGS. 6A–6C. Preferably, the insulator 26 is constructed of a material that is both electrically and thermally insulating. The insulator is constructed with an interior surface 106 and an exterior surface 108, the interior surface 106 surround the second end cap 24 when the insulator is assembled to the electromagnetic device. A peripheral edge 110 of the insulator has a generally square configuration except for notches 111 in place of the corners of the square configuration. The insulator peripheral edge 110 is complimentary to the peripheral edge 90 of the second end cap and extends completely around the edge of the second end cap when the insulator is assembled over the end cap. The sides of the insulator 113 closest to the second end cap 24 actually surround the stator winding turns on the second end cap. This particular construction of the insulator enables an overall reduction in the width of the motor. By employing these portions of the insulator sides 113 to surround the stator winding turns on the second end cap 24, the sides of the insulator, being constructed of an electrically insulating material, can be positioned much closer to the stator end turns than could an end shield constructed of metal. An end shield constructed of metal would have to be constructed with a greater width in order to ensure the metal of the end shield sides is spaced from the end turns of the stator to avoid contact and shorting of the metal end shield sides with the stator turns. By replacing the prior art end shield construction with the insulator 26 having sides 113 that surround the stator turns, the overall lateral width of the motor is reduced. A center hole 112 of the insulator is dimensioned sufficiently large to enable a bearing mounting collar of the second end shield 30 to extend therethrough, but still enables the insulator to provide sufficient coverage of the end turns of the stator over the second end cap posts 94 to insulate the windings from the metal of the second end cap 24. In addition, the insulator thermally insulates any electronic components used in association with the motor and attached to the second end shield from the heat generated in the stator.

The insulator also has a plurality of tubular lead guides 114 projecting longitudinally from the exterior surface 108 of the insulator. The number of lead guides 114 and their positioning on the insulator corresponds to the number and positioning of the male terminal supports 100 on the second end cap 24. With the insulator 26 assembled over the second end cap 24, the terminal supports 100 of the second end cap and the male terminals of the stator electrical leads they support project through the interiors of the lead guides 114. Thus, the tubular lead guides 114 with the electrical lead supports 100 positively position the male terminals of the stator where they can be easily connected with mating female electrical connectors of a separate electronics package 34 used in association with the electromagnetic device as the package is assembled to the second end shield 30. As the electronics package is connected to the second end shield 30, the female connectors are positioned on the electronics so that they will extend into the tubular lead guides 114 of the insulator. The tubular lead guides 114 function to guide the male terminals of the stator into the mating female terminals of the electronics package as the package is assembled to the second end shield 30. This enables a blind assembly of the electronics package onto the second end shield. With the insulator lead guides 114 guiding the female connectors over the male terminals, a good connection is ensured. In addition, the tubular lead guides 114 insulate the electric terminals from contact with the metal of the second end shield 30 as they extend through the end shield to its exterior surface where they can be connected to a separate electronics package.

The second end shield 30 is shown in FIGS. 7A–7C. In the preferred embodiment the second end shield 30 is constructed of metal, as is conventional. The second end shield 30 has a generally square configuration with opposite interior 120 and exterior 122 surfaces. The interior surface 120 is that which faces toward the stator stack 20. A shaft opening 124 passes through the end shield and is surrounded by a circular collar 126 that extends axially from the end shield interior surface 120. The collar 126 is provided to hold a bearing assembly that in turn mounts the rotor 32 for rotation on the end shield, as is typical in electric motor construction.

The peripheral edge of the end shield includes four columns 128 that project longitudinally and axially outwardly from the end shield interior surface 120. It can best be seen in FIG. 7B that the peripheral side wall 129 of the second end shield does not extend the full length of the columns 128 leaving spaces between the columns 128 adjacent their distal ends. These spaces are provided to accommodate the side walls 113 of the insulator. The columns 128 reach beyond the insulator side walls 113 when attaching the second end shield to the stator. By eliminating the sections of the metal side walls from the second end shield and replacing them with portions of the insulator side walls 113 that surround the stator end turns on the second end cap 24, the width of the second end shield and the overall width of the motor can be reduced while avoiding positioning the metal side walls of the second end shield too close to the stator end turns where the possibility of electrical shorting would exist. Each of the columns 128 has a fastener hole 130 extending therethrough. In addition, each of the columns has a base surface 132 formed thereon. As seen in FIG. 7B, the base surface 132 of each column 128 intersects the fastener hole 130. Shoulders 134 extend longitudinally outwardly from the base surfaces 132 of the columns to distal end surfaces 136 of each of the columns. Shoulder surfaces 138 extend between the base surfaces 132 and the end surfaces 136 of the columns. In the preferred embodiment of the invention, the base surfaces 132 are coplanar and are formed to mate complimentary with the second end surface 58 of the stator stack. In addition, the shoulder surfaces 138 are positioned to overlay and engage against pairs of flat surfaces 54 on the exterior surface of the stator stack with the fastener hole 130 of each column aligning with a trough 60 between the stator flat surfaces 54. The mating engagement of the shoulder surfaces 138 with the flat surfaces 54 of the stator stack secures the second end shield 30 against radial and/or torsional movement relative to the stator stack. In this manner, nut and bolt fasteners passing through the fastener holes 130 of the second end shield 30 and the troughs 60 across the exterior surface of the stator stack 20, in addition to the engagement of the shoulder surfaces 138 with the flat surfaces 54 on the exterior of the stator stack, securely hold the second end shield 30 stationary relative to the stator stack 20. By combining the engagement of the shoulder surfaces 138 against the stator flat surfaces 54 with a nut and bolt fastener to hold the second end shield to the stator stack 20, a much stronger connection is provided than by using a fastener alone. In addition, a smaller nut and bolt fastener may be used thereby contributing to the reduction in size of the overall electromagnetic device 18.

The second end shield 30 also has a number of lead openings 140 passing therethrough. The lead openings 140 have configurations and positions on the second end shield 30 that corresponds to the tubular lead guides 114 of the insulator 26. When the second end shield 30 is assembled to the stator stack 20 over the insulator 26, the tubular lead guides 114 extend through the lead openings 140 of the second end shield and thereby insulate the electrical leads of the stator from contacting the metal of the second end shield 30.

The peripheral edge 142 of the second end shield 30 is also provided with a pair of diagonally opposed holes 144 and a pair of diagonally opposed posts 146. The holes 144 and posts 146 provide a simple method of connecting an external electronics packages 34 to the second end shield 30.

The first end shield 28 is similar to the second end shield 30 and therefore will not be described in the same detail. In the preferred embodiment, the first end shield 28 is constructed of metal and also has a generally square configuration defined by its peripheral edge 152. The end shield has opposite interior 154 and exterior 156 surfaces with a shaft opening 158 passing therethrough. The first end shield also has four columns 160 projecting axially and longitudinally from the interior surface 154. Like the columns of the second end shield, the four columns 160 include base surfaces 162 and shoulders 164 with the shoulders having shoulder surfaces 166 and distal end surfaces 168 of the columns. A fastener hole 170 extends through each of the columns 160 and is intersected by the base surfaces 162.

The shoulder surfaces 166 and base surfaces 162 of the first end shield columns 160 function in the same manner as those of the second end shield columns 128. In addition, the fastener holes 170 of the first end shield columns 160 align with the troughs 60 on the exterior surface of the stator stack 20 in the same manner as the fastener holes 130 of the second end shield columns. The shoulder surfaces 166 and the flats 54 of the stator stack mate with each other to securely hole the first end shield 28 against torsional and/or radial movement relative to the stator stack in the same manner as the second end shield 30.

FIGS. 1 and 9–14 illustrate the assembly of the component parts of the electromagnetic device 18 of the invention. In FIG. 9, the first end cap 22 and second end cap 24 have been attached to the longitudinally opposite first end surface 56 and second end surface 58 of the stator stack 20. The first end shield 28 is attached to the stator stack 20 over the first end cap 22. The shaft of the rotor 32 is shown supported in a bearing 180 supported by the first end shield 28 in a conventional manner. The stator winding has been added to the stator stack 20 and the end turns are schematically represented at the first end 176 and second end 178 of the stator stack. It can be seen in FIG. 9 that the spacer 80 surrounds the end turns 176 of the stator winding and projects longitudinally beyond the end turns 176 to space the first end shield 28 from the end turns 176 and thereby prevent any shorting of the stator winding with the first end shield. At the second end surface 58 of the stator stack the electrical lead supports 100 of the second end cap 24 support stator leads 182.

FIG. 10 shows the insulator 26 assembled over the second end cap 24. The insulator peripheral edge 110 extends completely around the second end cap 24 and one of the insulator tubular lead guides 114 is shown surrounding the stator electrical lead 182 supported by the second end cap lead support 100.

FIG. 11 shows the second end shield 30, with a bearing 184 inserted into its bearing collar 126, assembled over the insulator 26. The bearing 184 supports the shaft of the rotor 32 in a conventional manner. The insulator lead guides 114 surrounding the stator electrical leads 182 project through the lead openings 140 of the second end shield 30 and project a short distance outwardly from the end shield exterior surface 122 where they can be easily accessed for connection with an external electronics package. The insulator 26 also spaces the second end shield 30 from the end turns 178 of the stator winding and electrically insulates the end turns 178 from the end shield 30. The insulator 26 also provides thermal insulation and for electronics attached to the exterior surface 122 of the end shield 30.

Referring to FIG. 1, a plurality of bolts 186 are inserted through the fastener holes 130 of the second end shield 30 and pass through the notches 111 of the insulator 26 and the notches 90 of the second end cap 24 and through the trough surface 60 on the exterior of the stator stack 20. The bolts 186 then pass through the notches 72 in the periphery of the first end cap 22 and through the fastener holes 170 of the first end shield 28. The ends of the bolts 186 can be screw threaded into complimentary internal threading in the fastener holes 170 of the first end shield 28 or can be threaded into nuts on the exterior surface 156 of the first end shield 128. The bolts 186, together with the shoulder surfaces of the end shields described earlier, securely hold together the component parts of the electromagnetic device 18.

FIGS. 1 and 12–14 also show an external electronics package 34 assembled to the second end shield 30 of the electromagnetic device. As shown in FIG. 1, the electronics package 34 includes a printed circuit board with electronics modules attached (PC board) 192 having holes 194 at each of its corners. The PC board holes 194 correspond to the peripheral edge holes 144 and peripheral edge posts 146 of the second end shield 30. A square housing wall 96 that could be constructed of metal or other material that would enable it to function as a heat sink as well as an enclosure for the PC board 192 is positioned over the PC board. The housing wall 196 has diagonally opposed grooves 198 at opposite interior corners. A housing cover 200 fits against the wall 196 and a pair of bolts 202 pass through holes 204 in the cover, through the housing wall grooves 198, through the PC board holes 194 and into the peripheral edge holes 144 of the second end shield 30. Internal threading in the peripheral edge holes 144 of the second end shield 30 securely attaches the electronics package 34 to the second end shield. The electronics package 34 can be constructed so that any electrical connectors of the package will coincide in position with the electrical leads 182 of the electromagnetic device 18 so that attaching the electronics package 34 to the second end shield 30 of the device also completes the electrical connections between the electronics package and the device.

From the above description it can be seen that by the design of the component parts of the electromagnetic device 18, the size of the device is significantly reduced while avoiding the potential problems of securely connecting the component parts of the device together and insulating, both electrically and thermally, the electrical component parts of the device from structural component parts.

While the present invention has been described by reference to a specific embodiment, it should be understood that modifications and variations of the invention may be constructed without departing from the scope of the invention defined in the following claims.

What is claimed:

1. An electromagnetic device comprising:

a stator stack having a longitudinal length with longitudinally opposite first and second end surfaces, an exterior surface between the first and second end surfaces and a center bore through the stator stack between the first and second end surfaces, first and second end shields covering over the respective first and second end surfaces of the stator stack, the first and second end shields each have a shaft opening aligned with the center bore of the stator stack, each of the end shields has a base surface that mates against one of the first and second end surfaces of the stator stack, and the first end shield has a shoulder that projects outwardly from the base surface of the first end shield and overlays a portion of the stator stack exterior surface, the shoulder has a shoulder surface that mates against the portion of the stator stack exterior surface and resists a relative torsional movement between the stator stack and the first end shield, the base surface and the shoulder surface are perpendicular to each other, the shoulder surface and the portion of the stator stack exterior surface are both flat surfaces; and, a plurality of threaded fasteners extend between the first and second end shields through the base surfaces of the first and second end shields and over the exterior surface of the stator stack and secure the first and second end shields to the respective first and second end surfaces of the stator stack.

2. The electromagnetic device of claim 1, wherein:

the first end shield has a pair of base surfaces that mate against the first end surface of the stator stack and a pair of shoulders that project outwardly from the pair of base surfaces and overlay portions of the stator stack exterior surface on laterally opposite sides of the stator stack.

3. The electromagnetic device of claim 2, wherein:

the pair of shoulders have shoulder surfaces that mate against the portions of the stator stack exterior surface on laterally opposite sides of the stator stack and the shoulder surfaces and the portions of the stator stack exterior surface are all flat.

4. The electromagnetic device of claim 1, wherein:

the stator stack center bore has a center axis and the shoulder surface and the portion of the stator stack exterior surface are parallel with the center bore center axis.

5. The electromagnetic device of claim 1, wherein:

the second end shield has a shoulder that projects outwardly from the base surface of the second end shield and overlays a second portion of the stator stack exterior surface, the second end shield shoulder has a shoulder surface that mates against the second portion of the stator stack exterior surface and resists a relative torsional movement between the stator stack and the second end shield.

6. The electromagnetic device of claim 5, wherein:

the portion of the stator stack exterior surface that the shoulder of the first end shield overlays and the second portion of the stator stack exterior surface that the shoulder of the second end shield overlays are portions of one flat surface that extends longitudinally across the exterior surface of the stator stack between the first and second end surfaces of the stator stack.

7. The electromagnetic device of claim 6, wherein:

at least one fastener of the plurality of fasteners overlays the portion of the stator stack exterior surface that the shoulder of the first end shield overlays and the second portion of the stator stack exterior surface that the shoulder of the second end shield overlays.

8. The electromagnetic device of claim 5, wherein:

the second end shield has a pair of base surfaces that mate against the second end surface of the stator stack and a pair of shoulders that project outwardly from the pair of base surfaces and overlay portions of the stator stack exterior surface on laterally opposite sides of the stator stack.

9. The electromagnetic device of claim 8, wherein:

the pair of shoulders of the second end shield have shoulder surfaces that mate against portions of the stator stack exterior surface on laterally opposite sides of the stator stack and the shoulder surfaces and the portions of the stator stack exterior surface are all flat.

10. An electromagnetic device comprising:

a stator stack having a longitudinal length with longitudinally opposite first and second end surfaces, an exterior surface between the first and second end surfaces, a center bore through the stator stack between the first and second end surfaces, and a stator winding around the center bore;

an end cap covering over the first end surface of the stator stack;

a first end shield covering over the end cap, the end cap spacing the first end shield from the stator winding;

an insulator covering over the second end surface of the stator stack;

a second end shield covering over the insulator, the insulator insulating the stator winding from the second end shield; and, the insulator has a tubular lead guide that projects longitudinally from the insulator, the stator winding has an electric terminal that is supported in the insulator tubular lead guide, the second end shield has a lead opening and the insulator tubular lead guide passes through the lead opening.

11. The electromagnetic device of claim 10, wherein:

the end cap has a spacer that projects longitudinally from the end cap and engages with the first end shield and thereby maintains a spacing between the first end shield and the stator windings.

12. The electromagnetic device of claim 10, wherein:

the tubular lead guide has a distal end with an opening therein providing access to the electric terminal supported by the lead guide through the opening, the opening being adapted to guide a separate electric terminal inserted through the opening onto the terminal supported in the lead guide.

13. An electromagnetic device comprising:

a stator stack having a longitudinal length with longitudinally opposite first and second end surfaces, an exterior surface between the first and second end surfaces, a center bore through the stator stack between the first and second end surfaces, and a stator winding around the center bore;

an end cap covering over the first end surface of the stator stack;

a first end shield covering over the end cap, the end cap spacing the first end shield from the stator winding;

an insulator covering over the second end surface of the stator stack;

a second end shield covering over the insulator, the insulator insulating the stator winding from the second end shield; and, the first end shield has longitudinally projecting columns that extend past the end cap and engage with the first end surface of the stator stack.

14. The electromagnetic device of claim 13, wherein:

the second end shield has longitudinally projecting columns that extend past the insulator and engage with the second end surface of the stator stack.

15. The electromagnetic device of claim 14, wherein:

the first end shield and the second end shield each have four of said columns.

16. The electromagnetic device of claim 14, wherein:

the columns of the first end shield each have a shoulder surface that mates against a portion of the stator stack exterior surface and resists a relative torsional movement between the stator stack and the first end shield and the columns of the second end shield each have a shoulder surface that mates against a portion of the stator stack exterior surface and resists a relative torsional movement between the stator stack and the second end shield.

17. The electromagnetic device of claim 16, wherein:

the shoulder surfaces of the columns of the first and second end shields and the portions of the stator stack exterior surface are all flat surfaces.

18. An electromagnetic device comprising:

a stator stack having a longitudinal length with longitudinally opposite first and second end surfaces, an exterior surface between the first and second end surfaces, a center bore through the stator stack between the first and second end surfaces, and a stator winding around the center bore;

an end cap covering over the first end surface of the stator stack;

a first end shield covering over the end cap, the end cap spacing the first end shield from the stator winding;

an insulator covering over the second end surface of the stator stack;

a second end shield covering over the insulator, the insulator insulating the stator winding from the second end shield; and, an external electronics package is connected to the second end shield on an opposite side of the second end shield from the insulator and the insulator provides both thermal and electrical insulation of the stator winding from the external electronics package.

* * * * *